Oct. 13, 1959 E. V. SUNDT 2,908,191
SPEED REDUCER FOR MOTORS
Filed Jan. 27, 1955 2 Sheets-Sheet 1
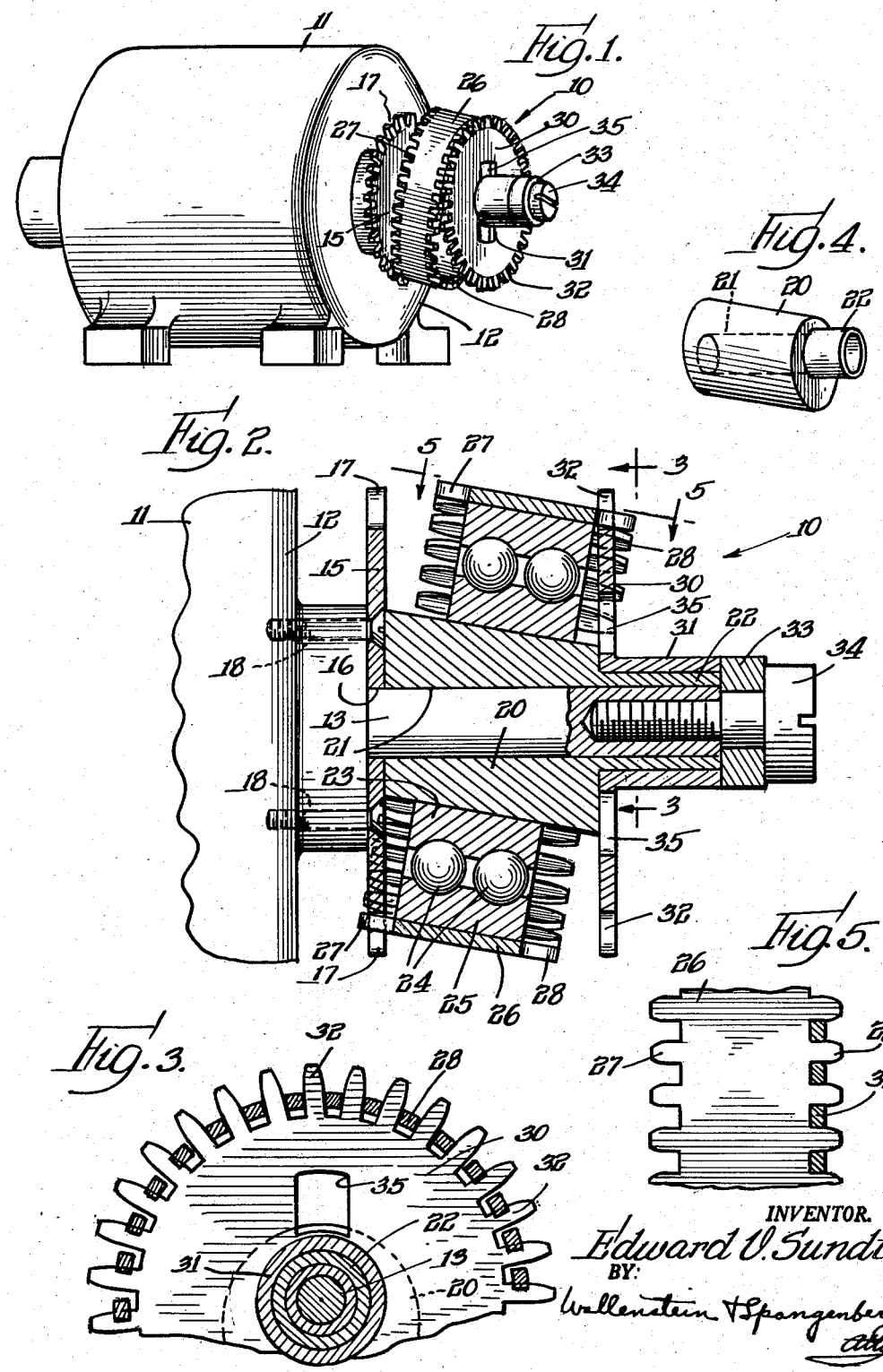
INVENTOR.
Edward V. Sundt
BY:
Wallenstein & Spangenberg
attys.

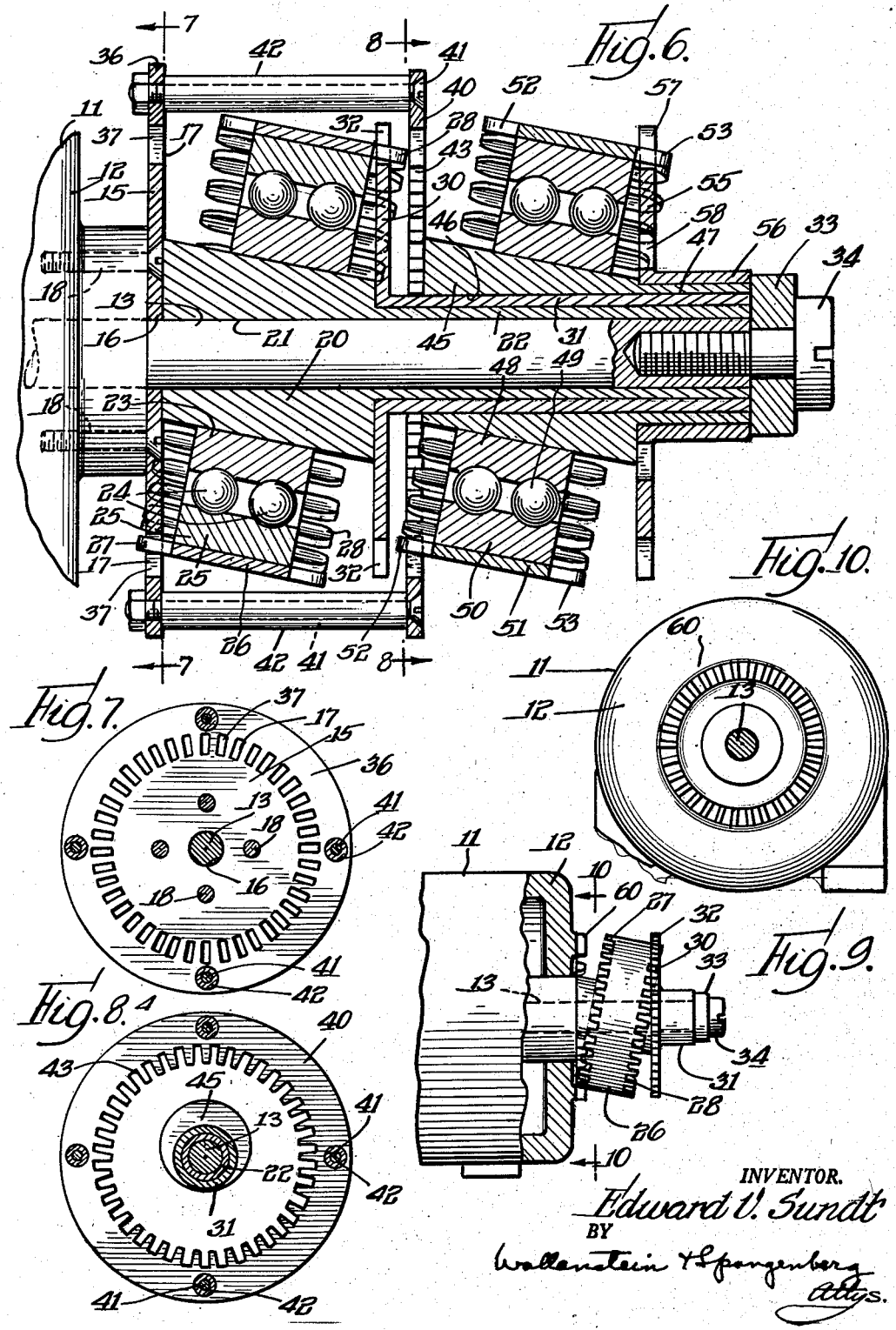

United States Patent Office 2,908,191
Patented Oct. 13, 1959

1

2,908,191
SPEED REDUCER FOR MOTORS
Edward V. Sundt, Wilmette, Ill.
Application January 27, 1955, Serial No. 484,423
8 Claims. (Cl. 74—804)

This invention relates to speed reducers.

The principal object of this invention is to provide an improved speed reducer of a differential wobbling gear type wherein large speed reduction ratios are obtained with a minimum of moving parts in a unit of comparatively small dimensions, wherein large torques and loads are readily handled, wherein uniform torque and speed relations are maintained between the input and output ends of the unit, wherein high efficiency is maintained, wherein the unit is simple in construction and inexpensive to manufacture, and wherein the unit may be readily applied to and supported by the shaft of an electric motor so as to be, in effect, a part of the motor.

Further objects of this invention reside in the details of construction of the speed reducer, in the co-operative relationships between the component parts thereof and in the association thereof with a motor.

Other objects and advantages of this invention will become apparent to those skilled in the art upon reference to the accompanying specification, claims and drawings, in which:

Fig. 1 is a perspective view of an electric motor with the speed reducer of this invention applied thereto. Fig. 2 is a vertical sectional view through the speed reducer illustrated in Fig. 1. Fig. 3 is a vertical sectional view taken substantially along the line 3—3 of Fig. 2. Fig. 4 is a perspective view of the oblique eccentric utilized in Figs. 1 and 2. Fig. 5 is a view partly in section taken substantially along the line 5—5 of Fig. 2. Fig. 6 is a vertical sectional view similar to Fig. 2, but illustrating a compound speed reducer. Fig. 7 is a sectional view taken substantially along the line 7—7 of Fig. 6. Fig. 8 is a sectional view taken substantially along the line 8—8 of Fig. 6. Fig. 9 is an elevational view partly in section illustrating another manner of associating the speed reducer with the motor. Fig. 10 is a sectional view taken substantially along the line 10—10 of Fig. 9.

One form of the speed reducer of this invention is generally designated at 10 in Figs. 1 and 2 and it is illustrated as being applied to an electric motor 11, having a frame 12, and a shaft 13 extending outwardly from the frame, the shaft 13 being driven at desired speeds by the electric motor. A stationary reaction gear 15 may be formed from a plate and is centrally provided with an opening 16 for accommodating the shaft 13. The outer edge of the plate 15 is provided with a plurality of notches arranged concentrically around the shaft 13 for forming teeth 17. This reaction gear, if desired, may be readily formed by conventional punch press operations. The reaction gear 15 may be suitably secured to the frame 12 of the electric motor 11, by means of screws 18 or the like.

Supported on and secured to the shaft 13, by means of a key or set screw or the like, is an oblique eccentric 20, this eccentric having a central opening 21 for receiving the motor shaft 13. Preferably, the oblique eccentric 20 is provided with a cylindrical extension 22 which, if desired, may be utilized as a bearing surface. Secured to the oblique eccentric 20 is the inner race of an anti-friction bearing having balls 24 and an outer race 25. The inner race 23 may be secured to the eccentric 20 in any desired manner as, for example by a pressed fit. A gear ring 26 is suitably secured to the outer race 25 as, for example, by a pressed fit. This gear ring 26, if desired, may be inexpensively manufactured from tube stock or the like. One edge of the gear ring 26 is provided with a plurality of notches for forming a plurality of teeth 27 and also the other edge thereof is provided with a plurality of notches for providing a plurality of teeth 28. The teeth 27 on one edge of the gear ring 26, mesh with the teeth 17 of the stationary reaction gear 15 so that when the shaft 13 and oblique eccentric are rotated the reaction gear 15 restrains rotation of the gear ring 26 and causes the gear ring 26 to be wobbled by the oblique eccentric 20. While the gear ring 26 is shown to be rotatably mounted on the oblique eccentric 20 by an anti-friction bearing, a plain bearing may be utilized for this purpose, although the former is preferable.

A driven gear 30, having a supporting hub portion 31, is rotatably mounted and supported by the motor shaft 13. As illustrated, the driven gear 30 is journaled on the cylindrical extension 22 which provides a good bearing surface therefor. However, the driven gear could be journaled on the shaft 13 itself, although the former is preferred. The driven gear 30, which may be formed by drawing and stamping operations, is in the nature of a plate and is provided at its outer periphery with a plurality of notches forming a plurality of teeth 32. The teeth 32 of the driven gear 30 mesh with the teeth 28 of the gear ring 26. A thrust bearing 33, held in place on the shaft 13 by a screw 34, may be utilized for maintaining the driven gear 30 in position on the cylindrical extension 22. To facilitate power take off from the driven gear 30, it may be provided with a pair of notches 35 for receiving lugs carried by the element to be driven.

In operation, the rotating motor shaft 13 rotates the oblique eccentric 20 which, in turn, wobbles the gear ring 26. If the gear ring 26 has the same number of teeth 27 as the number of teeth 17 of the stationary reaction gear 15, then no rotating motion is imparted to the gear ring 26. If the number of teeth 27 is greater than the number of teeth 17, the gear ring 26 will be forwardly rotated and if the number of teeth 27 is less than the number of teeth 17, the gear ring 26 will be rearwardly rotated, the differences in amount of rotation in either direction being dependent upon the differences in the number of teeth. As the gear ring 26 is wobbled its teeth mesh with the teeth of the driven gear 30 and if the number of teeth 28 on the gear ring 26 is the same as the number of teeth 32 on the driven gear 30, there is no relative rotation between the two. If, however, the number of teeth 28 is greater than the number of teeth 32, then the driven gear 30 is driven forwardly by the gear ring 26. On the other hand, if the number of teeth 28 is less than the number of teeth 32, then the driven gear 30 is driven backwardly by the gear ring 26. In all instances the amount of relative movement between the driven gear 30 and the gear ring 26 is dependent upon the differences in the number of teeth. By utilizing different combinations of numbers of teeth 17, 27, 28 and 32, a great number of reduction ratios can be realized. As an example, using only three different teeth numbers, the following end speeds are realized when driven by an 1800 r.p.m. motor.

| Teeth 17 | Teeth 27 and 28 | Teeth 32 | Resultant speed, r.p.m. |
|---|---|---|---|
| 31 | 32 | 30 | 60 |
| 32 | 32 | 30 | 120 |
| 33 | 32 | 30 | 180 |
| 32 | 32 | 31 | 55 |
| 33 | 32 | 31 | 110 |
| 31 | 32 | 31 | 0 |

An almost infinite number of gear reduction ratios are possible by changing, as desired, ratios of teeth and these can be further extended by compounding as will be described below in connection with Figs. 6 to 8 of the drawing. Since the gears having the gear teeth 17, 27, 28 and 32 are essentially modified spur gears, a high order of efficiency (about 95%) is realized. This compares favorably with the 65% to 80% efficiency usually realized in worm gear reduction of a corresponding value. Because all of the parts are concentrically mounted about the axis of rotation of the shaft 13, uniform torque and speed relations are maintained between the input and output ends of the reducer and large torques and heavy loads may be readily handled without the introduction of vibration strains and the like. At the same time the speed reducer is simple in construction and inexpensive to manufacture, and it may be readily applied as a unit to an electric motor so as to be, in effect, a part of the motor.

The construction of and the manner of operation of the speed reducer illustrated in Figs. 6 to 8 are very much like those of the speed reducer illustrated in Figs. 1 to 5 and, accordingly, like reference characters for like parts have been utilized. The speed reducer of Figs. 6 to 8 differs from the speed reducer described above in that it provides for compound speed reduction action, in effect, combining two reducers in series. The first stage is like that described above with the exception that the stationary reaction gear 15 is provided with an annular extension 36 and the teeth 17 are formed by closed notches 37. The second stage of the speed reducer is driven from the driven gear 30. The second stage includes a second stationary reaction gear 40 which is secured by screws 41 and spacers 42 to the annular extension 36 of the first stationary reaction gear 15. This second stationary reaction gear 40 is provided with a plurality of notches for forming teeth 43 which are concentrically located about the axis of the motor shaft 13. A second oblique eccentric 45 is provided with an opening 46 therethrough for receiving the supporting hub portion 31 of the first driven gear 30, this second oblique eccentric 45 being secured thereto in any suitable manner, as by a key, a set screw or the like. Preferably this second oblique eccentric 45 is provided with a cylindrical extension 47 to serve as a journal bearing. An inner race 48 of an anti-friction bearing is secured to the oblique eccentric 45 and the anti-friction bearing also includes balls 49 and an outer race 50 to which is secured a second gear ring 51 having teeth 52 and 53 formed on each edge thereof by suitable notches. A second driven gear 55 having a supporting hub portion 56 is rotatably mounted on the cylindrical extension 47 of the second oblique eccentric 45. This second driven gear 55 is provided with teeth 57 meshing with the teeth 53, it being understood that the teeth 52 of the gear ring 51 mesh with the teeth 43 of the second reaction gear 40. All of the parts are held in assembled relation on the shaft 13 by the thrust bearing 33 and screw 34. Here, the second driven gear 55 may also be provided with a plurality of openings 58 for receiving lugs carried by a member to be driven. The manner of operation of the second stage of the gear reduction is the same as that described above in connection with the first stable and, accordingly, a further description thereof is not considered necessary. Since the second stage of gear reduction is driven by the first driven member 30, a compounding action is provided.

The speed reducer illustrated in Figs. 9 and 10 is very much like that illustrated in Figs. 1 to 5 and like reference characters for like parts have been utilized. The arrangement of Figs. 9 and 10 differs from the above-described arrangement in the manner in which the stationary reaction gear is formed and in which the speed reducer is associated with the electric motor. Here the frame 12 of the electric motor is integrally provided with a plurality of teeth concentrically arranged about the shaft 13 so that the necessity for a separate reaction gear 15 and its securing means is eliminated. Here, the integral teeth 60 on the motor frame 12 mesh with the teeth 27 on the gear ring 26 to provide speed reduction in substantially the same manner described above. This arrangement is particularly adaptable for original equipment manufacture.

While for purposes of illustration several forms of this invention have been disclosed, other forms thereof may become apparent to those skilled in the art upon reference to this disclosure and, therefore, this invention is to be limited only by the scope of the appended claims.

I claim as my invention:

1. A motor having a frame end wall and a rotating shaft journaled in and extending outwardly beyond the frame end wall and being cantilevered beyond said frame end wall, a stationary reaction gear on the motor frame end wall having teeth about and concentric with the motor shaft, an oblique eccentric secured upon the cantilevered portion of the motor shaft for rotation therewith, a gear ring rotatably mounted on the oblique eccentric and having teeth on opposite edges thereof, the teeth on one edge of the gear ring meshing with the teeth of the stationary reaction gear to restrain rotation of the gear ring and to cause the gear ring to be wobbled by the oblique eccentric, a driven gear rotatably mounted and supported solely by the cantilevered portion of the motor shaft and having teeth meshing with the teeth on the other edge of the gear ring, said driven gear being rotated at a reduced speed with respect to the speed of rotation of the shaft in accordance with the relations between the number of teeth of the gear ring, reaction gear and driven gear.

2. A motor having a frame end wall and a rotating shaft journaled in and extending outwardly beyond the frame end wall and being cantilevered beyond said frame end wall, a plurality of teeth integrally formed on the motor frame end wall about and concentric with the motor shaft and forming a stationary reaction gear, an oblique eccentric secured upon the cantilevered portion of the motor shaft for rotation therewith, a gear ring rotatably mounted on the oblique eccentric and having teeth on opposite edges thereof, the teeth on one edge of the gear ring meshing with the teeth of the stationary reaction gear to restrain rotation of the gear ring and to cause the gear ring to be wobbled by the oblique eccentric, a driven gear rotatably mounted and supported solely by the cantilevered portion of the motor shaft and having teeth meshing with the teeth on the other edge of the gear ring, said driven gear being rotated at a reduced speed with respect to the speed of rotation of the shaft in accordance with the relations between the number of teeth of the gear ring, reaction gear and driven gear.

3. A motor having a frame end wall and a rotating shaft journaled in and extending outwardly beyond the frame end wall and being cantilevered beyond said frame end wall, a stationary reaction gear having teeth, means for securing the stationary reaction gear to the motor frame end wall with the teeth thereof about and concentric with the motor shaft, an oblique eccentric secured upon the cantilevered portion of the motor shaft for rotation therewith, a gear ring rotatably mounted on the oblique eccentric and having teeth on opposite edges thereof, the teeth on one edge of the gear ring meshing with the teeth of the stationary reaction gear to restrain rotation of the gear ring and to cause the gear ring to be wobbled by the oblique eccentric, a driven gear rotatably mounted and supported solely by the motor cantilevered portion of the shaft and having teeth meshing with the teeth on the other edge of the gear ring, said driven gear being rotated at a reduced speed with respect to the speed of rotation of the shaft in accordance with the relations between the number of teeth of the gear ring, reaction gear and driven gear.

4. A motor having a frame end wall and a rotating shaft journaled in and extending outwardly beyond the frame end wall and being cantilevered beyond said frame end wall, a stationary reaction gear on the motor frame end wall having teeth about and concentric with the motor shaft, an oblique eccentric having an outwardly extending cylindrical extension and secured upon the cantilevered portion of the motor shaft for rotation therewith, a gear ring rotatably mounted on the oblique eccentric and having teeth on opposite edges thereof, the teeth on one edge of the gear ring meshing with the teeth of the stationary reaction gear to restrain rotation of the gear ring and to cause the gear ring to be wobbled by the oblique eccentric, a driven gear supported solely by and rotatably mounted on the cylindrical extension of the oblique eccentric and having teeth meshing with the teeth on the other edge of the gear ring, said driven gear being rotated at a reduced speed with respect to the speed of rotation of the shaft in accordance with the relations between the number of teeth of the gear ring, reaction gear and driven gear.

5. A motor having a frame end wall and a rotating shaft journaled in and extending outwardly beyond the frame end wall and being cantilevered beyond said frame end wall, a stationary reaction gear on the motor frame end wall having teeth about and concentric with the motor shaft, an oblique eccentric secured upon the cantilevered portion of the motor shaft for rotation therewith, an anti-friction bearing including an outer race and an inner race secured to the oblique eccentric, a gear ring having teeth on opposite edges thereof and secured to the outer race of the anti-friction bearing so as to be rotatably mounted on the oblique eccentric, the teeth on one edge of the gear ring meshing with the teeth of the stationary reaction gear to restrain rotation of the gear ring and to cause the gear ring to be wobbled by the oblique eccentric, a driven gear rotatably mounted and supported solely by the cantilevered portion of the motor shaft and having teeth meshing with the teeth on the other edge of the gear ring, said driven gear being rotated at a reduced speed with respect to the speed of rotation of the shaft in accordance with the relations between the number of teeth of the gear ring, reaction gear and driven gear.

6. A motor having a frame end wall and a rotating shaft journaled in and extending outwardly beyond the frame end wall and being cantilevered beyond said frame end wall, a stationary reaction gear on the motor frame end wall having teeth about and eccentric with the motor shaft, an oblique eccentric having an outwardly extending cylindrical extension and secured upon the cantilevered portion of the motor shaft for rotation therewith, an anti-friction bearing including an outer race and an inner race secured to the oblique eccentric, a gear ring having teeth on opposite edges thereof and secured to the outer race of the anti-friction bearing so as to be rotatably mounted on the oblique eccentric, the teeth on one edge of the gear ring meshing with the teeth of the stationary reaction gear to restrain rotation of the gear ring and to cause the gear ring to be wobbled by the oblique eccentric, a driven gear supported solely by and rotatably mounted on the cylindrical extension of the oblique eccentric and having teeth meshing with the teeth on the other edge of the gear ring, said driven gear being rotated at a reduced speed with respect to the speed of rotation of the shaft in accordance with the relations between the number of teeth of the gear ring, reaction gear and driven gear.

7. A motor having a frame end wall and a rotating shaft journaled in and extending outwardly beyond the frame end wall and being cantilevered beyond said frame end wall, a stationary reaction gear on the motor frame end wall having teeth about and concentric with the motor shaft, an oblique eccentric having an outwardly extending cylindrical extension and secured upon the cantilevered portion of the shaft for rotation therewith, an anti-friction bearing including an outer race and an inner race secured to the oblique eccentric, a gear ring including a cylindrical sleeve having a plurality of notches in the opposite edges thereof forming teeth on the opposite edges thereof, said gear ring being secured to the outer race of the anti-friction bearing so as to be rotatably mounted on the oblique eccentric, the teeth on one edge of the gear ring meshing with the teeth of the stationary reaction gear to restrain rotation of the gear ring and to cause the gear ring to be wobbled by the oblique eccentric, a driven gear supported solely by and rotatably mounted on the cylindrical extension of the oblique eccentric and including a supporting hub portion and a substantially flat plate portion having a plurality of notches arranged concentrically about the shaft forming teeth meshing with the teeth on the other edge of the gear ring, said driven gear being rotated at a reduced speed with respect to the speed of rotation of the shaft in accordance with the relations between the number of teeth of the gear ring, reaction gear and driven gear.

8. A motor having a frame end wall and a rotating shaft journaled in and extending outwardly beyond the frame end wall and being cantilevered beyond said frame end wall, a stationary reaction gear on the motor frame end wall having teeth about and concentric with the motor shaft, an oblique eccentric secured upon the cantilevered portion of the motor shaft for rotation therewith, a gear ring rotatably mounted on the eccentric and including a cylindrical sleeve having a plurality of notches in the opposite edges thereof forming teeth on the opposite edges thereof, the teeth on one edge of the gear ring meshing with the teeth of the stationary reaction gear to restrain rotation of the gear ring and to cause the gear ring to be wobbled by the oblique eccentric, a driven gear rotatably mounted and supported solely by the cantilevered portion of the shaft and including a supporting hub portion and a substantially flat plate portion having a plurality of notches arranged concentrically about the shaft forming teeth meshing with the teeth on the other edge of the gear ring, said driven gear being rotated at a reduced speed with respect to the speed of rotation of the shaft in accordance with the relations between the number of teeth of the gear ring, reaction gear and driven gear.

References Cited in the file of this patent

UNITED STATES PATENTS

| | | |
|---|---|---|
| 544,796 | Shaw | Aug. 20, 1895 |
| 1,316,936 | Blackman | Sept. 23, 1919 |
| 1,561,021 | Quick | Nov. 10, 1925 |
| 2,378,507 | Sharpe | June 19, 1945 |
| 2,379,273 | Bluemink | June 26, 1945 |
| 2,528,470 | Elder | Oct. 31, 1950 |
| 2,699,690 | Kobler | Jan. 18, 1955 |

FOREIGN PATENTS

| | | |
|---|---|---|
| 504,406 | Canada | July 20, 1954 |